United States Patent [19]

Ruggeri

[11] 3,719,338
[45] March 6, 1973

[54] BOMBLOAD HANDLING APPARATUS
[75] Inventor: Joseph P. Ruggeri, Cherry Hill, N.J.
[73] Assignee: The United States of America as represented by the secretary of the Navy
[22] Filed: Feb. 23, 1971
[21] Appl. No.: 117,898

[52] U.S. Cl. ............................................ 244/137 R
[51] Int. Cl. ................................................ B64c 1/22
[58] Field of Search ........ 244/137 R; 89/1.5 R, 1.5 C; 248/228

[56] References Cited

UNITED STATES PATENTS 2,386,839  10/1945  Bronson ............................. 89/1.5 C
2,734,705  2/1956  Robertson ....................... 244/137 R Primary Examiner—Trygve M. Blix
Attorney—R. S. Sciascia, H. Hansen and A. A. McGill

[57] ABSTRACT

Subject disclosure relates to novel and improved apparatus for loading and unloading a bombload ejection subassembly on an aircraft bombrack. When an asymmetric bombload is to be handled, the apparatus includes a sheave assembly which is secured to the bombload assembly such that its axis of rotation is positioned vertically above the center of gravity of the bombload assembly, an elongated support beam which is mounted on the bombrack, a single cantilever element which may be adjustably positioned on the beam and extends outwardly over the sheave assembly and a hoist mechanism which is cradled on the end of the cantilever element and controls a lifting cable which is reeved about the sheave assembly. When a symmetric bombload is to be handled, the apparatus includes a pair of sheave assemblies which extend outwardly from opposite sides of the bombload assembly, a pair of elongated support beams which are mounted on opposite sides of the bombrack, a pair of cantilever elements which are secured to the bombrack frame above the sheave assemblies, and a hoist mechanism.

10 Claims, 4 Drawing Figures

PATENTED MAR 6 1973

INVENTOR.
JOSEPH P. RUGGERI
BY
Arthur L. Collins
ATTORNEY

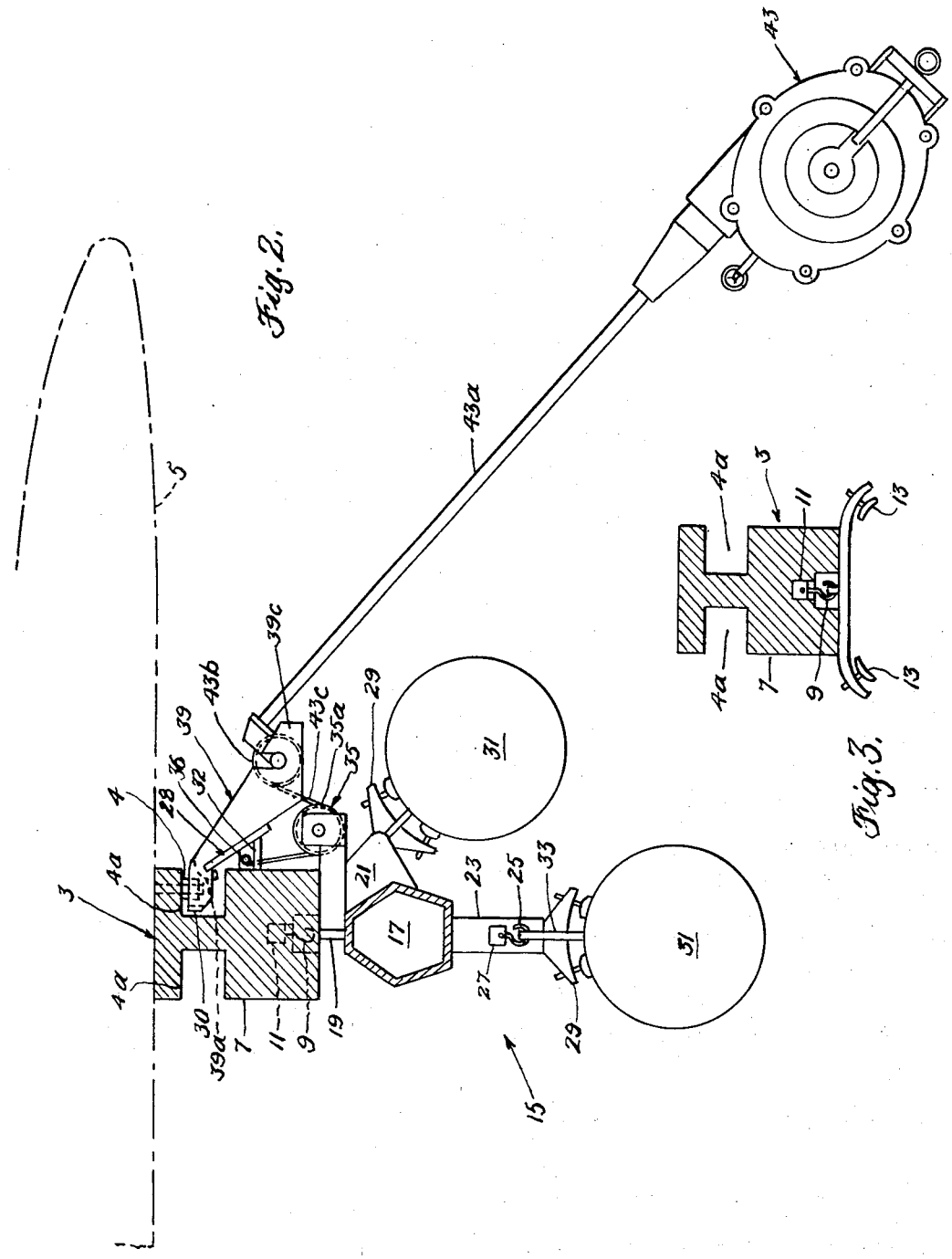

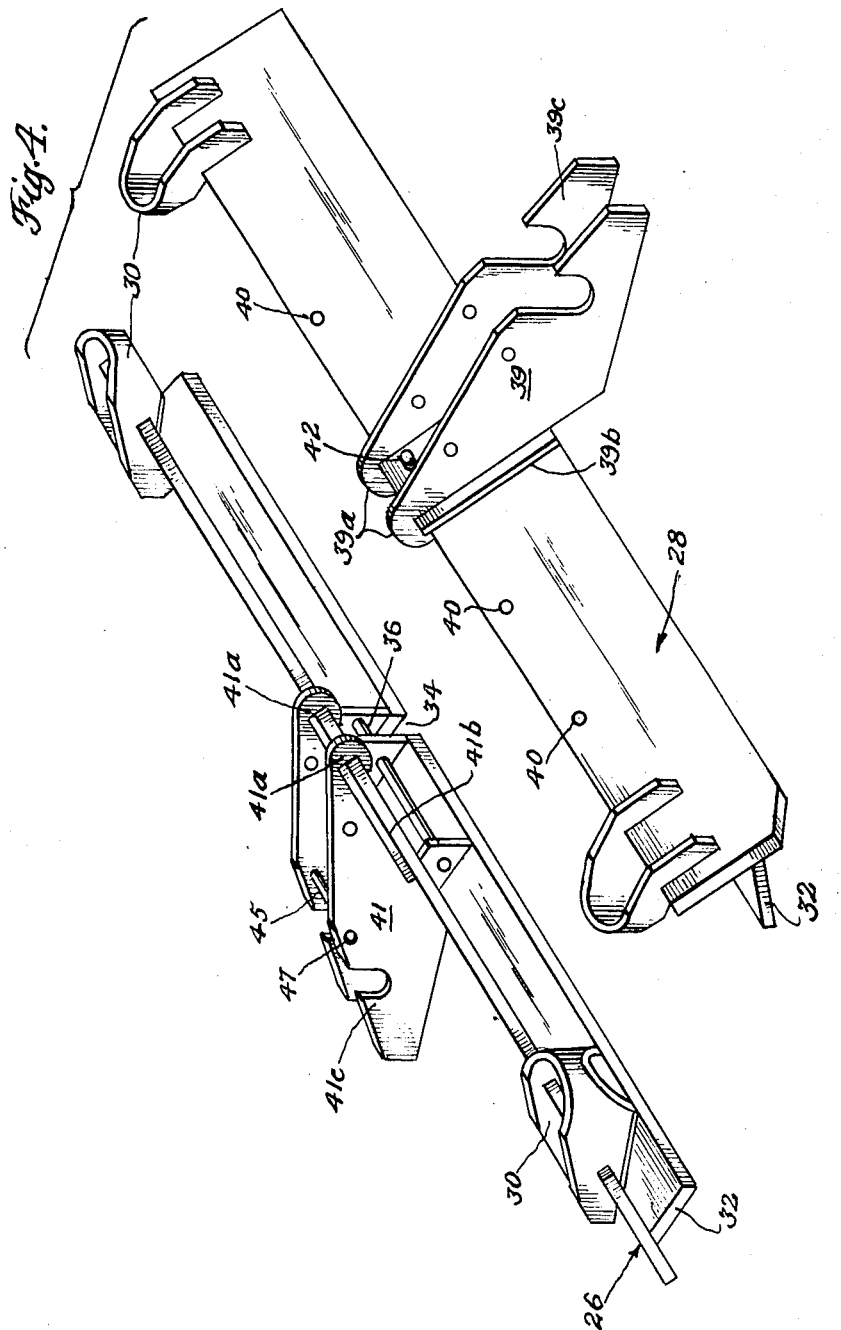

BOMBLOAD HANDLING APPARATUS

The invention described herein may be manufactured and used by or for the Government of the United States of America for governmental purposes without the payment of any royalties thereon or therefor.

Various types of handling apparatus have been devised and used in the past to load and unload bombloads on military aircraft. Considerable difficulty has been experienced heretofore, however, in providing apparatus of this kind which satisfies the requirements of the operation in a practical and effective manner.

It is therefore a principal object of the invention to provide novel and improved apparatus for loading and unloading a bombload on an aircraft.

It is a further object of the invention to provide novel and improved handling apparatus which maintains asymmetric as well as symmetric bombloads in a stable condition during loading and unloading operations.

It is therefore a further object of the invention to provide novel and improved bombload handling apparatus which requires the use of only one hoist mechanism.

It is a further object of the invention to provide novel and improved bombload handling apparatus which doubles the mechanical advantage of the hoist mechanism used, thereby permitting the use of one 2,000 lbs. capacity hoist in raising 4,000 lbs. loads.

It is a further object of the invention ro provide novel and improved bombload handling apparatus which is readily mounted on a particular type of aircraft bombrack.

Other objects and many of the attendant advantages of this invention will be readily appreciated as the same becomes better understood by reference to the following detailed description when considered in connection with the accompanying drawing wherein:

FIG. 2 is an end view partly in section of a preferred embodiment of the invention where an asymmetrical bombload is being loaded on an aircraft; and FIG. 3 is an enlarged cross-sectional view of a preferred embodiment of a bombrack to which a bombload assembly may be secured by means of the improved apparatus of the invention.

FIG. 4 is a perspective view of both of the elongated supporting beams of the invention with a cantilever element mounted thereon.

Figure 1:
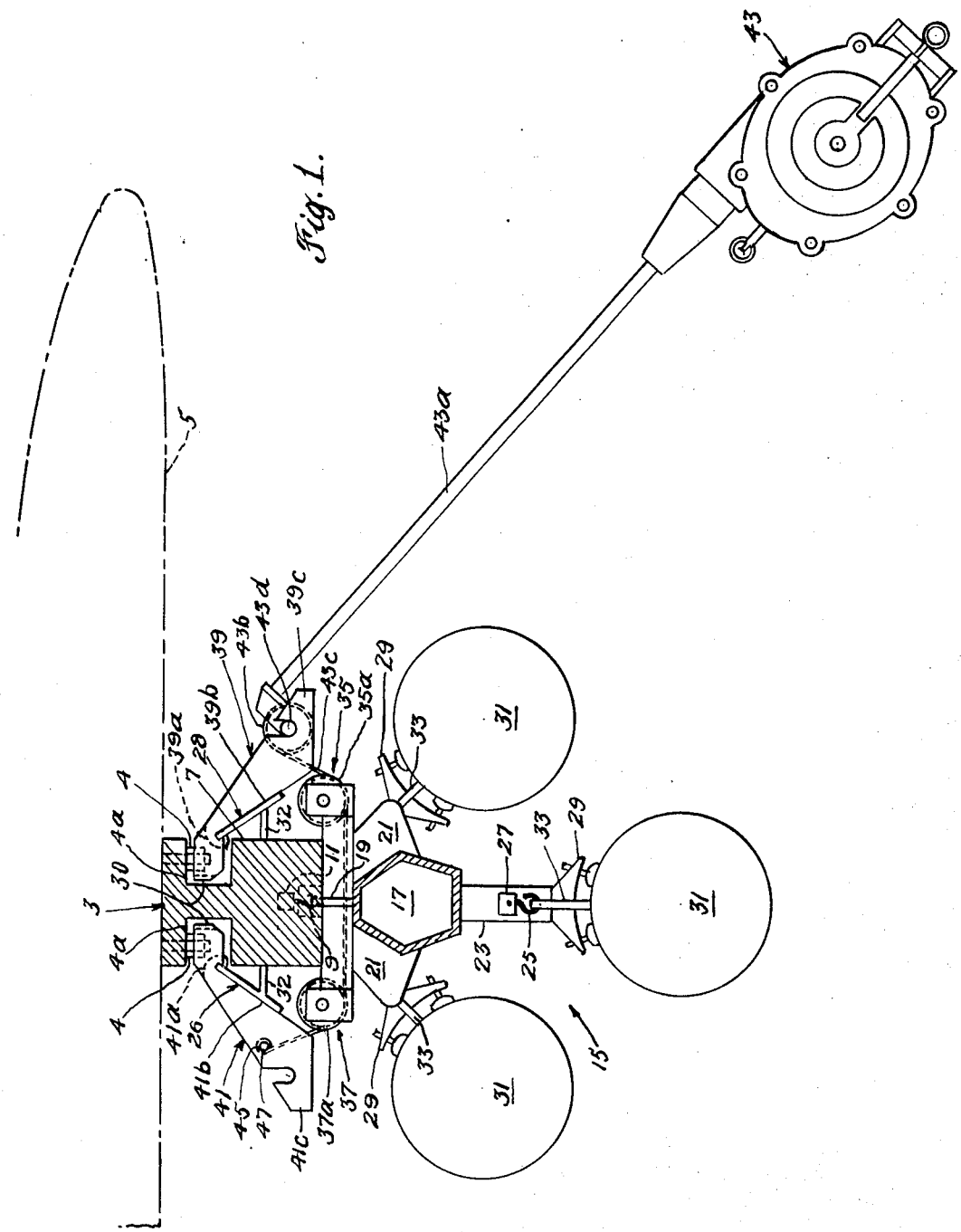
FIG. 1 is an end view partly in section of a preferred embodiment of the invention where a symmetrical bombload is being loaded on an aircraft.

Referring now to the various figures of the drawing, it will be noted that the bombrack 3 is suspended from the lower surface of the wing or fuselage 5 of the aircraft by the bolt or stud 4. The cavity 4a in the bombrack 3 provides access to the nut and end of the bolt 4 for application or removal of the nut thereon. The bombrack 3 includes the elongated structural frame or housing 7 which is generally rectangular in cross section, two or more bombload suspension hooks 9 positioned in recesses in the bottom of the frame 7, an ejector mechanism 11 which controls operation of the suspension hooks 9 between open and closed positions and two or more pairs of adjustable sway braces 13. Inasmuch as the structural and operative details of the identified and other components of the bombrack 3 by themselves form no part of the present invention, a full description of the same is not included herein for the sake of simplicity. For a full understanding of the invention, it need only be understood that for release and ejection of the entire bombload assembly 15, a suitable mechanical or electrical impulse is employed to energize the ejector mechanism 11, operate the suspension hooks 9 to their open position and release the bombload assembly 15 from the rack 3. The conventional adjustable sway braces 13 engage the exterior surface of the bombload assembly 15 and limit its pitching and yawing movement on the suspension hooks 9.

The bombload assembly 15 includes a hexagonal structural frame member 17, two or more suspension lugs 19 that are adapted to engage the suspension hooks 9 on the rack 3, and one or more individual bomb accommodation and ejection units 21. Each bomb accommodation and ejection unit 21 includes a frame or housing 23, one or more bomb suspension hooks 25, an ejector mechanism 27 which controls operation of the suspension hooks between open and closed positions and two or more pairs of adjustable sway braces 29. Again, inasmuch as the structural and operative details of the identified and other components of the bombload assembly 15 by themselves form no part of the invention, a full description of the same are not included herein for the sake of simplicity. For a full understanding of the invention, it need only be understood that for release and ejection of any individual bomb 31 of the bombload assembly 15, a suitable mechanical or electrical impulse is employed to energize the associated ejector mechanism 27, disengage the associated suspension hooks 25 from the lugs 33 on the bomb 31 and eject the bomb 31. The conventional adjustable sway braces 29 engage the exterior surface of the bomb 31 prior to its ejection and limit its pitching and yawing movement on the suspension hooks 25.

As will be more apparent hereinafter, during a bombload loading and/or unloading operation, an elongated support beam 26 or 28 is positioned along either or both sides of the bombrack 3. EAch beam includes a cup-shaped anchoring device 30 which is secured adjacent opposite ends of the beam and projects upwardly and inwardly therefrom into the adjacent bombrack cavity 4a for engagement with the end of the nut and bolt 4 that secures the bombrack to the aircraft wing or fuselage. Braces 32 are secured to the inner face of each beam 26 and 28 and project inwardly for engagement with the adjacent face of the bombrack 3 when the beam is mounted on the bombrack for a loading or unloading operation. The brace for each beam is preferably divided into a pair of sections or cutaway as at 34 so that, as will be more apparent hereinafter, the end of a bombload hoisting cable may be engaged by the anchor pin 36 when an asymmetric load is to be handled.

During a bombload handling operation, the cantilever elements 39 and 41 may be slidably positioned at predetermined points 40 therealong by a suitable locking pin 42. As shown in the drawing, each cantilever element preferably consists of a generally U-shaped structure that includes a hook-shaped extremity 39a or 41a that is adapted to engage the upper edge of its associated beam 26 or 28, a bottom planar surface 39b or 41b that engages the outer surface of the beam and a bifurcated hooked extremity 39c or 41c which supports a hoist device 43.

The sheave assemblies 35 and 37 may be secured in any suitable conventional manner to the hexagonal frame member 17 of the bombload assembly 15 such that they project outwardly from either or both sides thereof. Each sheave assembly includes a sheave 35a or 37a which is journaled on an axis which lies vertically above the center of gravity of the bombload assembly 15 when the same is asymmetrically loaded as shown in FIG. 2 of the drawing.

The hoist 43 is of conventional design and preferably includes a gas powered cable storage and pay out reel not shown in the drawing, an elongated tubular arm 43a, a sheave 43b journaled on the end of arm 43a and a cable 43c. The bifurcated hook-shaped projection 39c or 41c of the cantilever element 39 or 41 is designed to cradle the trunnioned ends of the shaft 43d on which the sheave 43b of hoist 43 rotates such that the hoist 43 is supported thereby and extends downwardly and outwardly from the bombload assembly 15. When a symmetrical bombload is to be secured on the aircraft, as indicated in FIG. 1 of the drawing, the cable 43c of hoist 43 extends from the hoist storage and pay out reel, through its tubular arm 43a, about the sheave 43b, about the sheave 35a on one side of the bombload assembly 15, about the sheave 37a on the other side of the bombload assembly 15 to a suitable pin element or the like 45 which when secured in the aperture 47 in the cantilever element 41 provides a suitable anchor for the end of cable 43c. When an asymmetrical bombload is to be secured on the aircraft, as indicated in FIG. 2 of the drawing, the cable 43c extends from the storage and pay out reel of the hoist 43, through the tubular arm 43a, about the sheave 43b, about the sheave 35a on the bombload assembly 15 to the pin element 36.

In operation, when a symmetrical load is to be secured on the aircraft as in FIG. 1 of the drawing, the bombload assembly 15 is positioned beneath the aircraft wing or fuselage 5 such that the upwardly directed lugs 19 are vertically aligned with the suspension hooks 9 on the ejector rack 3. The sheave assemblies 35 and 37 are then secured to the bombload assembly 15 such that they extend outwardly from opposite sides thereof. The cantilever elements 39 and 41 are positioned on the beams 26 and 28 and fixed with respect to their longitudinal movement therealong by pins 42. The elongated cantilever support beams 26 and 28 are then positioned on opposite sides of the bombrack 3 such that the anchoring devices 30 engage the nuts on the bolt ends 4 in the bombrack cavity 4a and the braces 32 engage the adjacent faces of the rack. The hoist 43 is then positioned and cradled on the bifurcated hook-shaped projection of one cantilever element 39. The cable 43c of the hoist is then reeved from the hoist sheave 43b about the sheaves 35a and 37a on the bombload assembly 15 to the anchoring pin 45 in aperture 47 of cantilever element 41. The hoist 43 is then energized so that cable 43c is retracted and the bombload assembly 15 is lifted upwardly toward the rack 3 on the aircraft. When the lugs 19 on the bombload assembly are fully inserted in the recesses in the ejection rack 3, the suspension hooks 9 are operated to their closed position where they engage lugs 19 and secure the bombload assembly on the aircraft. The cantilever element anchor pin 45 is then removed, cable 43c is withdrawn from sheaves 35a and 37a and the hoist 43 is removed from cantilever element 39. The cantilever beams 26 and 28 with their respective cantilever elements 39 and 41 are then removed from the frame of the rack 3, the sheave assemblies 39 and 41 are removed from the bombload assembly 15 and the bomb load on the aircraft is ready for other preflight operations not forming a part of this invention.

Removal of the bombload assembly 15 from the aircraft is accomplished by reversing the described bomb loading procedure.

When an asymmetrical load is to be secured on the aircraft as in FIG. 2 of the drawing, again the bombload assembly 15 is positioned beneath the aircraft wing or fuselage 5 such that the lugs 19 are vertically aligned with the suspension hooks 9 on the rack 3. The sheave assembly 35 is then secured to the bombload assembly 15 such that it extends outwardly from the side of the assembly 15 that is more heavily loaded. The cantilever element 39 is positioned on the bema 28 and fixed with respect to its longitudinal movement therealong by pin 42. The cantilever support beam 28 is then positioned on the bombrack 3 such that anchoring devices 30 engage the nuts on the bolt ends 4 in the bombrack cavity 4a and the brace 32 engages the adjacent face of the rack 3. The hoist 43 is then positioned and cradled on the bifurcated hook-shaped extremity of cantilever element 39. The cable 43c of the hoist is then reeved from the hoist sheave 43b about the sheave 35a on the bombload assembly to the anchoring pin 36 slidably mounted between the beam 28 and its brace 32. The hoist is then energized so that cable 43c is retracted and the bombload assembly is lifted on its center of gravity upwardly toward the rack 3 on the aircraft. When the lugs 19 of the bombload assembly are fully inserted in the recesses in the rack 3, the suspension hooks 9 are operated to their closed position where they engage lugs 19 and secure the bombload assembly on the aircraft. The cantilever element anchor pin 36 is then removed, the sheave assembly 35 is removed from the bombload assembly 15, the cantilever element 39 is removed from the beam, the beam is removed from the rack and the bomb load on the aircraft is ready for other preflight operations not forming a part of this invention.

Removal of the bombload assembly 15 from the aircraft is accomplished by reversing the described bomb loading procedure.

Obviously, many modifications and variations of the present invention are possible in the light of the above teachings. It is therefore to be understood that within the scope of the appended claims, the invention may be practiced otherwise than as specifically described.

What is claimed is:

1. Apparatus for loading and unloading an aircraft bombrack, said apparatus comprising:
   a. an elongated support beam;
   b. means for mounting the beam on the bombrack such that it projects downwardly and outwardly from one side thereof;
   c. a cantilever element which contacts, hooks and locks on the beam and extends outwardly therefrom;
   d. a bombload assembly having a rotatably mounted sheave;

e. a cable hoist which is mounted on the cantilever element and extends downwardly and outwardly therefrom;

f. and a cable which is fixed at one end with respect to the beam and extends downwardly around the sheave and upwardly to the hoist.

2. The apparatus substantially as described in claim 1 wherein the bombload assembly is not symmetrically loaded and the extended center of gravity of the bombload assembly passes upwardly through the axis of the sheave and the outwardly extended cantilever element.

3. The apparatus substantially as described in claim 1 wherein the cantilever element may be adjustably positioned and locked on the beam at predetermined points therealong.

4. The apparatus substantially as described in claim 1 and further including a brace secured to the beam such that it extends inwardly from the beam and engages the adjacent face of the bombrack when the beam is mounted on the bombrack.

5. The apparatus substantially as described in claim 1 wherein the means for mounting the beam on the bombrack includes a U-shaped anchoring device secured adjacent each end of the beam, each said anchoring device engaging an end of bolt means that secure the bombload to the aircraft.

6. Apparatus for loading and unloading an aircraft bombrack, said apparatus comprising:

a. an elongated support beam;

b. means for mounting the beam on the bombrack such that it projects downwardly and outwardly from one side thereof;

c. a cantilever element which hooks and locks on the beam and extends outwardly therefrom;

d. a cable hoist which is mounted on the cantilever element and extends downwardly and outwardly therefrom;

e. another elongated support beam;

f. means for mounting the other beam on the bombrack such that it projects downwardly and outwardly from the other side thereof;

g. another cantilever element which hooks and locks on the other beam and extends outwardly therefrom;

h. a bombload assembly having first and second sheaves mounted on opposite sides thereof; and i. a cable extending from a fixed point on the other cantilever element downwardly around the sheaves and upwardly to the hoist.

7. The apparatus substantially as described in claim 6 wherein the bombload assembly is symmetrically loaded.

8. The apparatus substantially as described in claim 6 wherein both cantilever elements may be adjustably positioned and locked on their respective support beams at predetermined points therealong.

9. The apparatus substantially as described in claim 6 wherein a brace is secured to each beam such that they extend inwardly and respectively engage adjacent faces of the bombrack when the beams are mounted on the bombrack.

10. The apparatus substantially as described in claim 6 wherein the means for mounting each beam on the bombrack includes a U-shaped anchoring device secured adjacent each end of the beam, each said anchoring device engaging an end of bolt means that secure the bombload to the aircraft.

* * * * *